United States Patent
Kanamori et al.

(10) Patent No.: US 7,406,716 B2
(45) Date of Patent: Jul. 29, 2008

(54) SOFTWARE IP PROVIDING SYSTEM AND METHOD, SOFTWARE IP OBTAINING METHOD, AND IP CORE DESIGNING AND MANUFACTURING METHOD

(75) Inventors: Takeshi Kanamori, Minato-ku (JP); Yoshiko Hase, Minato-ku (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 820 days.

(21) Appl. No.: 10/457,545

(22) Filed: Jun. 10, 2003

(65) Prior Publication Data
US 2004/0255152 A1 Dec. 16, 2004

(51) Int. Cl.
*G06F 11/00* (2006.01)

(52) U.S. Cl. .............................. 726/28; 726/26; 726/27; 380/200; 713/187

(58) Field of Classification Search .................. 705/26; 726/26, 27, 28; 380/200, 25; 713/187
See application file for complete search history.

(56) References Cited

U.S. PATENT DOCUMENTS

| | | | |
|---|---|---|---|
| 5,265,163 A | * | 11/1993 | Golding et al. ............... 726/19 |
| 6,477,683 B1 | | 11/2002 | Killian et al. |
| 6,477,697 B1 | | 11/2002 | Killian et al. |
| 2001/0027484 A1 | * | 10/2001 | Nishi ......................... 709/223 |
| 2002/0138319 A1 | * | 9/2002 | Kaburagi et al. ............... 705/7 |
| 2003/0055736 A1 | * | 3/2003 | Eldridge et al. ............... 705/26 |

FOREIGN PATENT DOCUMENTS

| | | |
|---|---|---|
| JP | 2001-312611 | 11/2001 |
| JP | 2003-030262 | 1/2003 |

* cited by examiner

*Primary Examiner*—Kambiz Zand
*Assistant Examiner*—Roderick Tolentino
(74) *Attorney, Agent, or Firm*—Oblon, Spivak, McClelland, Maier & Neustadt, P.C.

(57) ABSTRACT

A system and method enables controlled distribution of processor IPinformation to users for evaluation, customization and/or production. One aspect of the system and method is a web site that helps coordinate the IP distribution of the processor IP information between a administrator and end-users, and affiliates of the end-users, namely design houses, tool providers and/or foundries. The processor IP information has a configuration specification including a definable portion of the user. By controlling the distribution of the processor IPinformation, while still allowing for convenient access, the system and method enable many users to customize the processor IPinformation for a variety of applications, with license condition being granted to the user to manufacture the customized units.

9 Claims, 14 Drawing Sheets

SOFTWARE IP PROVIDING SYSTEM AND METHOD, SOFTWARE IP OBTAINING METHOD, AND IP CORE DESIGNING AND MANUFACTURING METHOD

BACKGROUND OF THE INVENTION

1. Field of the Invention

The present invention relates to systems, methods, computer program product and apparatuses for providing processor intellectual property (IP), as well as obtaining processor IP for designing and manufacturing processor configurable semiconductor products. More specifically, the present invention relates to processor IP core information, such as processor core RTL, and the software for manufacturing the same by enabling for the controlled distribution of IP over computer networks so as to enable the design and manufacture of user-configurable processors.

2. Description of the Related Art

An IP (intellectual property) core is a block of logic or data that is used in making a semiconductor device such as a field programmable gate array (FPGA) or an application-specific integrated circuit (ASIC) that is configured to perform a specified task. In modem processor-based design applications, the "reuse" of core design features is becoming more popular in the electronic design automation industry. By having trusted design components, on which to base a device, it is faster and more reliable to design systems using trusted building blocks. Ideally, IP cores are portable in that they may be easily inserted into any particular vendor technology or design methodology.

FIG. 1 is a block diagram showing a conventional interaction between the IP core owner 1, a licensee/user 3, and related entities, all of which are usually required to produce a legally licensed product. As shown in FIG. 2, the IP owner 1 owns the IP in the processor core (see FIG. 1) for example. An end user 3, however, may wish to use that IP core for design and development of its own product. Conventionally, the user 3 negotiates with the IP owner 1 to obtain a license agreement (i.e., a contract, or legal instrument), which is typically customized based on the negotiation between the two parties. Consistent with the contract terms, the licensee/user 3 is usually burdened with a reporting requirement, which requires the licensee/user 3 to report to the IP owner 1 how many parts are made with the IP core, so that the licensee/user 3 can pay the negotiated royalty amount.

However, even after the licensee/user 3 obtains the, usually non-exclusive, rights to the IP core, the end product is far from being completed. The licensee/user 3 still must coordinate with a design house 5, whose job is to assist the licensee/user 3 in actually developing an end product that meets the users' requirements. Thus, another round of negotiation between the user 3 and the design house 5 ensues, where the net result is a contract with the design house 5. Usually, however, issues arise regarding the use of the IP by the design house 5, which may need to be reconciled with terms specified by the IP owner 1. These agreements and negotiations can be significant timing impediments, which can create significant delays for the licensee/user 3 to get a product to market. Furthermore, it is typical that disputes over supporting the design developed by the design house 5 arise, as well as questions about reporting whether the design ultimately is owned by the design house 5, licensee/user 3, or even the IP owner 1. Thus, the negotiation and ultimate resolution between the licensee/user and design house 5, can be extensive, and adversely impact the design time and time to delivery of the product.

However, a risk with this approach is that the foundry 9 may not necessarily honor a third party license between the licensee/user 3 and the IP owner 1. Thus, there is a risk that the foundry 9 may improperly extend its access to the design provided by the licensee/user 3, to provide a knock-off product to a non-licensee 11. Thus, no accounting to the intellectual property owner 1 would be made, and the non-licensee 11 would be unjustly enriched by ignoring the IP of the IP owner 1.

SUMMARY OF THE INVENTION

The present invention, only a brief summary of selected aspect of which is provided in this section, is intended to address the above-identified and other limitations with conventional IP core licensing, as well as design and manufacturing limitations of conventional semiconductor systems and methods.

One aspect of the present invention is that it creates an objective and computer-based mechanism for facilitating the execution of contracts for delivery of IP from an administrator in charge of administrating the IP core information (such as a processor core RTL). The administrator of the IP is empowered to grant automated access to selected licensees, based on a level of authorization granted by the IP administrator in light of requests by the selected licensees. This way, the potential users of the IP core may, with relatively limited contractual obligations, have access for evaluation purposes to the IP core, but may not manufacture. While a grant of manufacturing products including IP core information may be made, it is only granted after the licensee/user contractually agrees with the administrator to comply with the terms of the license. To this end, the IP administrator provides identification (ID), as well as corresponding password level security to the licensee/user, depending on the level of access that the user is entitled to obtain based on the contractual obligation previously agreed to by the licensee/user and the IP administrator.

The IP administrator optionally elects to implement the communication regarding the license over the Internet, by way of presenting a license on a webpage hosted by the administrator, or by a downloadable file. In this way, the IP administrator holds the identification and password information for all licensed users, so that based on input information from the licensed users, the IP administrator, after verifying the appropriate access levels for those given users, can actually grant access to approved users to the more protected information (such as IP core information) held by the memories of the computer system used to implement the website. When the appropriate contractual level of obligation is ascribed to by the licensee, the EP administrator grants access to the user/licensee so they may download the IP core information (such as a processor core RTL) by way of the external communication network, such as the Internet, or local area network, or wide area network, for example.

Another feature of the invention is to assist licensee/users by providing a list of registered design houses, which have already received approval (after executing a license) from the IP administrator to work with users/licensees on the design of new products, based on at least a processor core available from the IP administrators' website.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
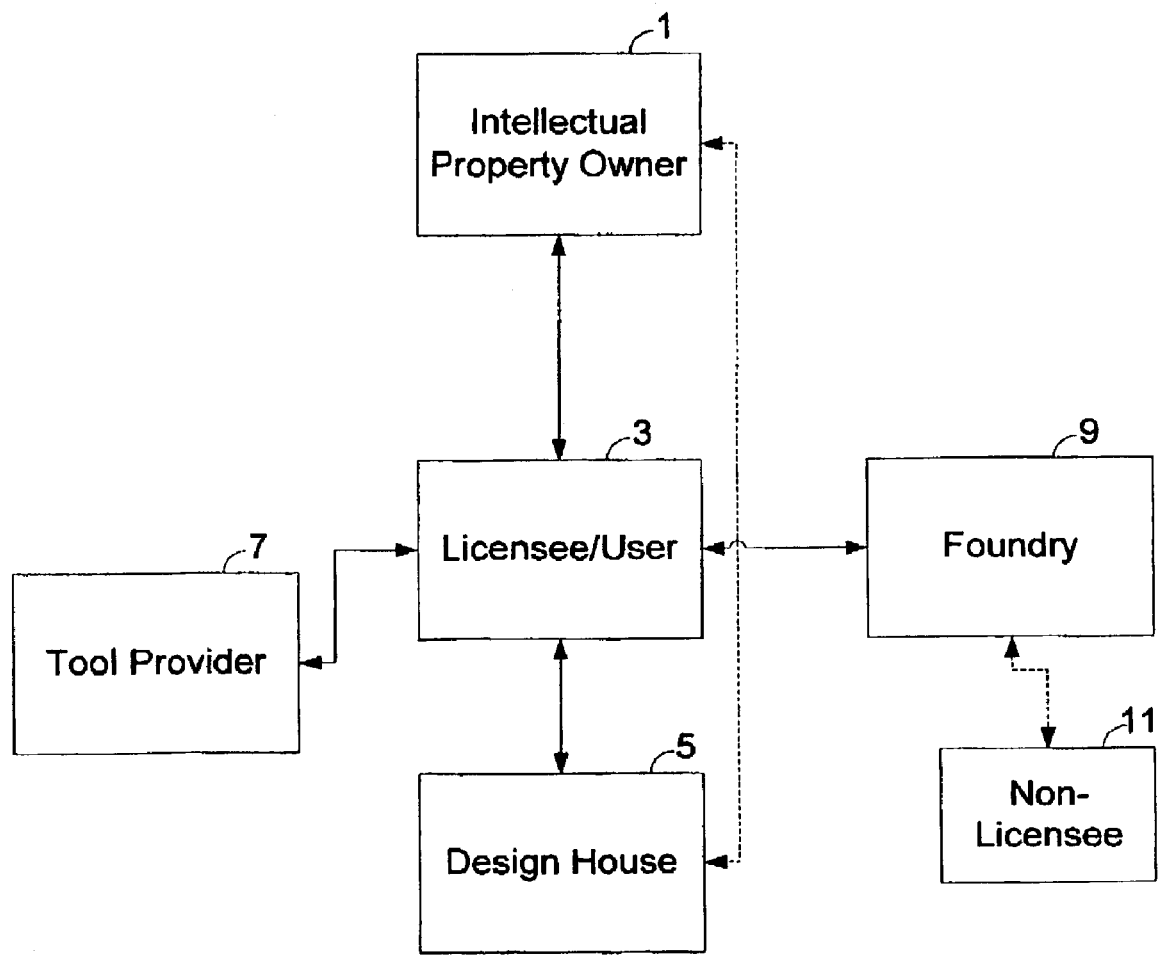
FIG. 1 is a block diagram of a conventional arrangement for exchanging intellectual property, as well as technology between an intellectual property owner, licensee/user, design house, tool provider, and foundry.

Referring now to the drawings, wherein like reference numerals designate identical or corresponding parts throughout the several views.

According to one embodiment of the present invention, a Media Embedded Processor (MeP) provides both configurability and extensibility inherent in its architecture. The MeP best fits "systems on a chip" (SoCs) where highly customized modules execute various digital media processing like video, image, audio, networks, etc., in parallel because it is capable of optimizing its configurations and appending application-specific extensions such as user-defined instructions. A basic feature of the MeP is that it can be configured to handle different media applications that may require different functions, depending on the particular application. The MeP is a heterogeneous multiprocessor that provides better performance in terms of cost, power, area and system flexibility than conventional designs. For example, the MeP has been used to create MPEG-2 CODECS (coder/decoder) on a single chip, and thus is one SoC example. "Users" or "configurers" of the MeP can use high-level languages such as C to initially design the SoC so that short development times may be realized. Development tools such as compilers, system simulators and debuggers are supplied by third parties to further develop the software instructions that specify the functions, as well as the tools for creating logic level design from the high-level or intermediate level designs.

Figure 2:
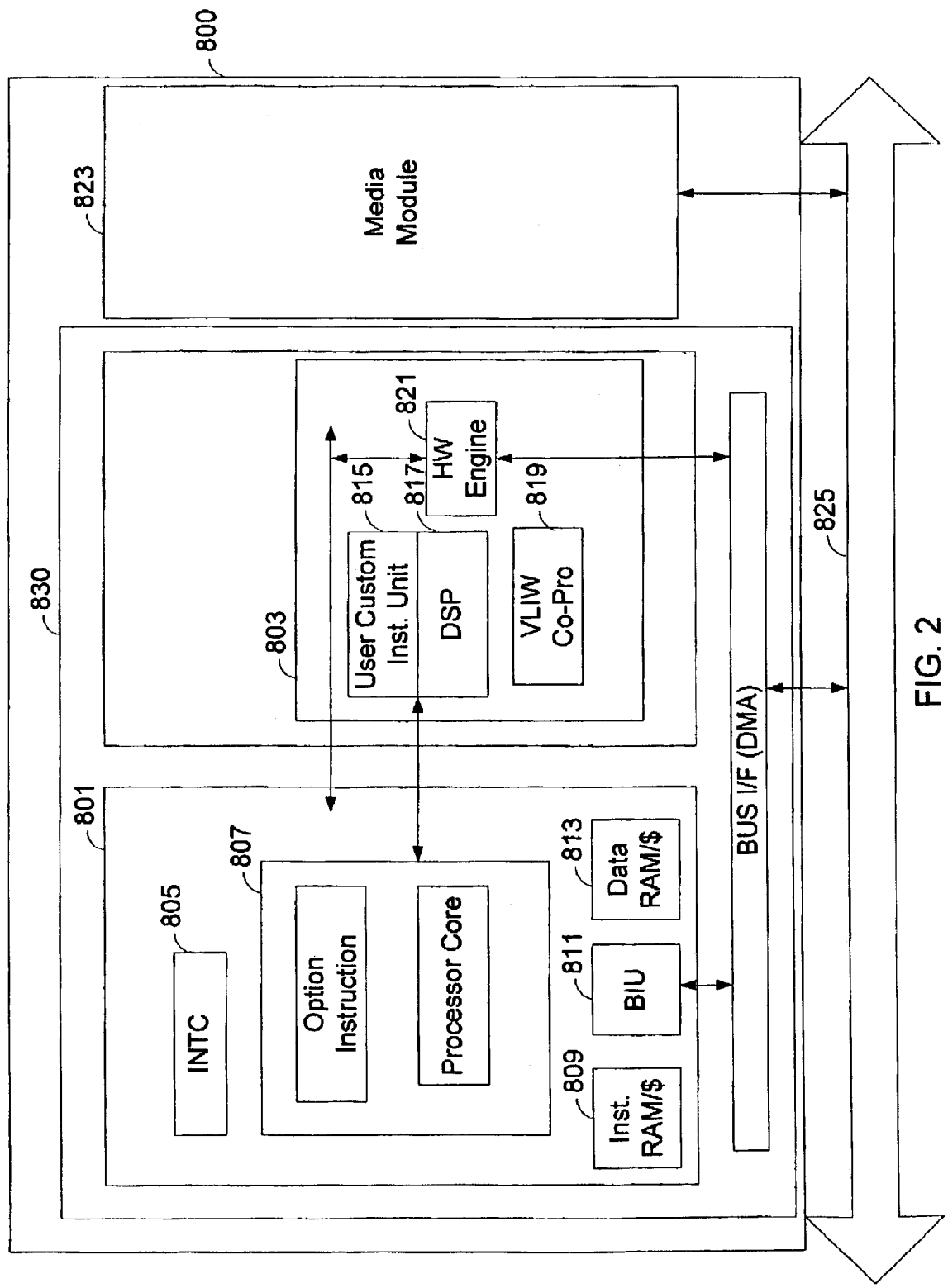
FIG. 2 is a block diagram of a processor SoC that includes a processor core.

FIG. 2 is an exemplary block diagram of a processor SoC 800 based on the MeP. The processor SoC 800 includes a plurality of media modules and one media module 830 includes a processor core 801 that exchanges data with a extension/peripheral IP 803 via interface and possibly another media module 823 as shown, each of which communicate by way of a common bus 825. The communication between the media modules 823 and 830 may be done through both bus I/F in the media modules 823 and 830 as shown, without the common bus 825. The processor core 801 includes an interrupt controller (INTC) 805 that services interrupts for the processor core. The processor core 801 also includes a CPU 807 having a RISC processor, for example, as well as a configurable, user-definable option instruction set contained therein. The CPU 807 cooperates with an instruction RAM 809 that holds the instructions therein, as well as a data RAM 813 for holding data. The bus interface unit 811 cooperates with a bus interface unit for providing direct memory access services and for exchanging data between the processor core and the extension/peripheral IP 803.

The extension/peripheral IP 803 is also reconfigurable and can optionally include an instruction extension, hosted on the user custom instruction unit 815. A digital signal processor (DSP) 817 is included that is able to execute the extension instructions contained in the custom instruction unit 815. A hardware engine 821 provides the requisite computation and interface features so that the processor module is able to communicate with external devices. A very long instruction word co-processor 819 is optionally included for helping to ease processor burden and enhance calculation speed. Additional media modules 823 may be included as well to perform additional functions.

The MeP is configured to perform numerous applications, and presently SoC solutions based on the MeP have been made in the form of audio CODECS, MPEG-2 encoders and decoders, and MPEG-4. Numerous examples of how the MeP may be used in various applications is well-known in the industry and thus further explanation about how the MeP is customized, is omitted from further discussion herein.

Figure 3:
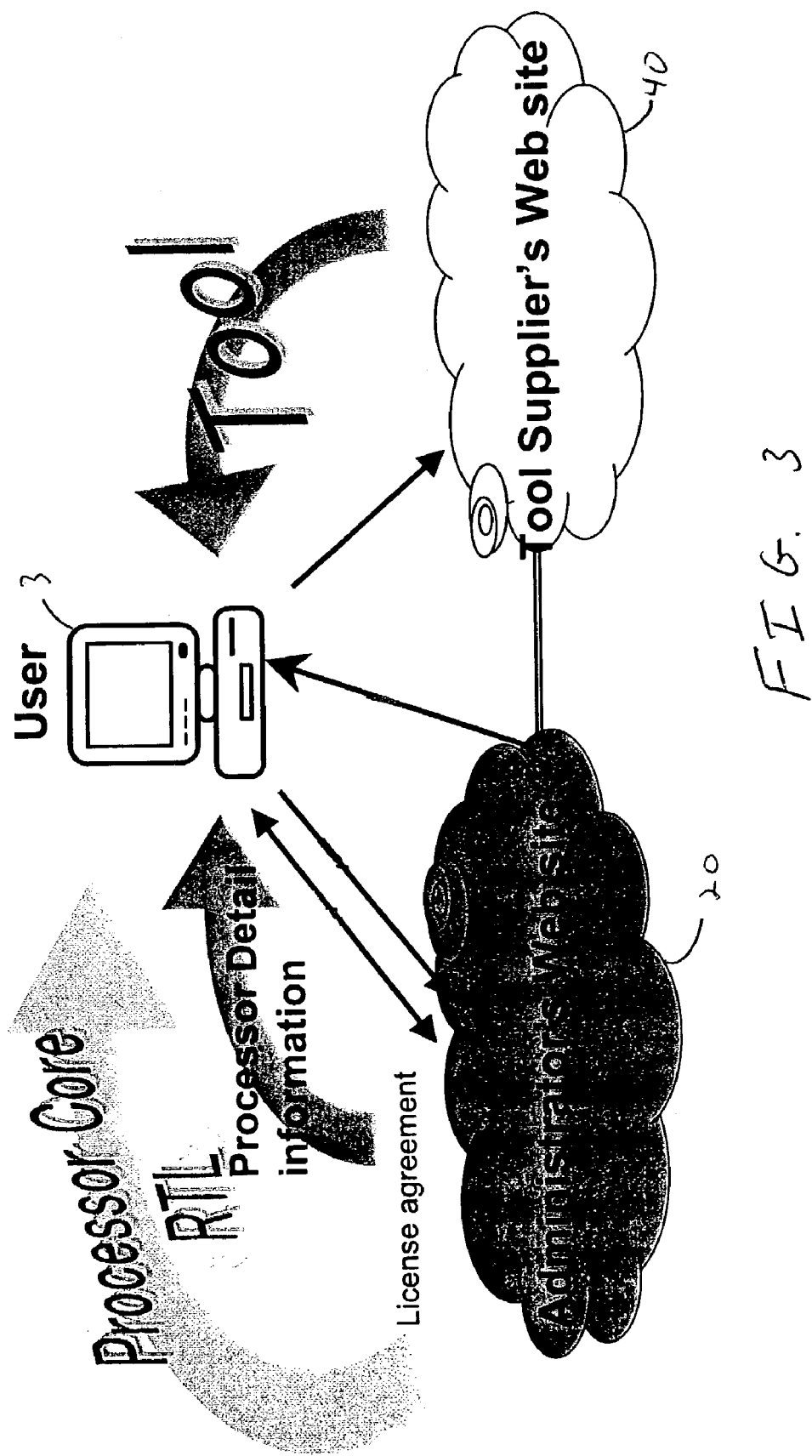
FIG. 3 is a diagram showing an exchange of data and contractual information between a user and an administrator website, so as to provide access to information hosted on the administrator website and a tool supplier's website.

FIG. 3 is a block diagram of a first embodiment of the present invention. An administrator's website 20 is coupled to a user 3 by way of a communication link. The communication link may be any one of a publicly accessible link, such as the Internet, or a private link, such as a dedicated wire to wireless network, local area network, or wide area network, for example. Likewise, the administrator's website 20 is connected to a tool supplier's website 40. This connection again may be by way of a dedicated communication link, or a publicly accessible link. Also, the tool supplier's website 40 may be included in the administrator's website 20, depending on the arrangement between the administrator and the tool supplier.

Figure 12:
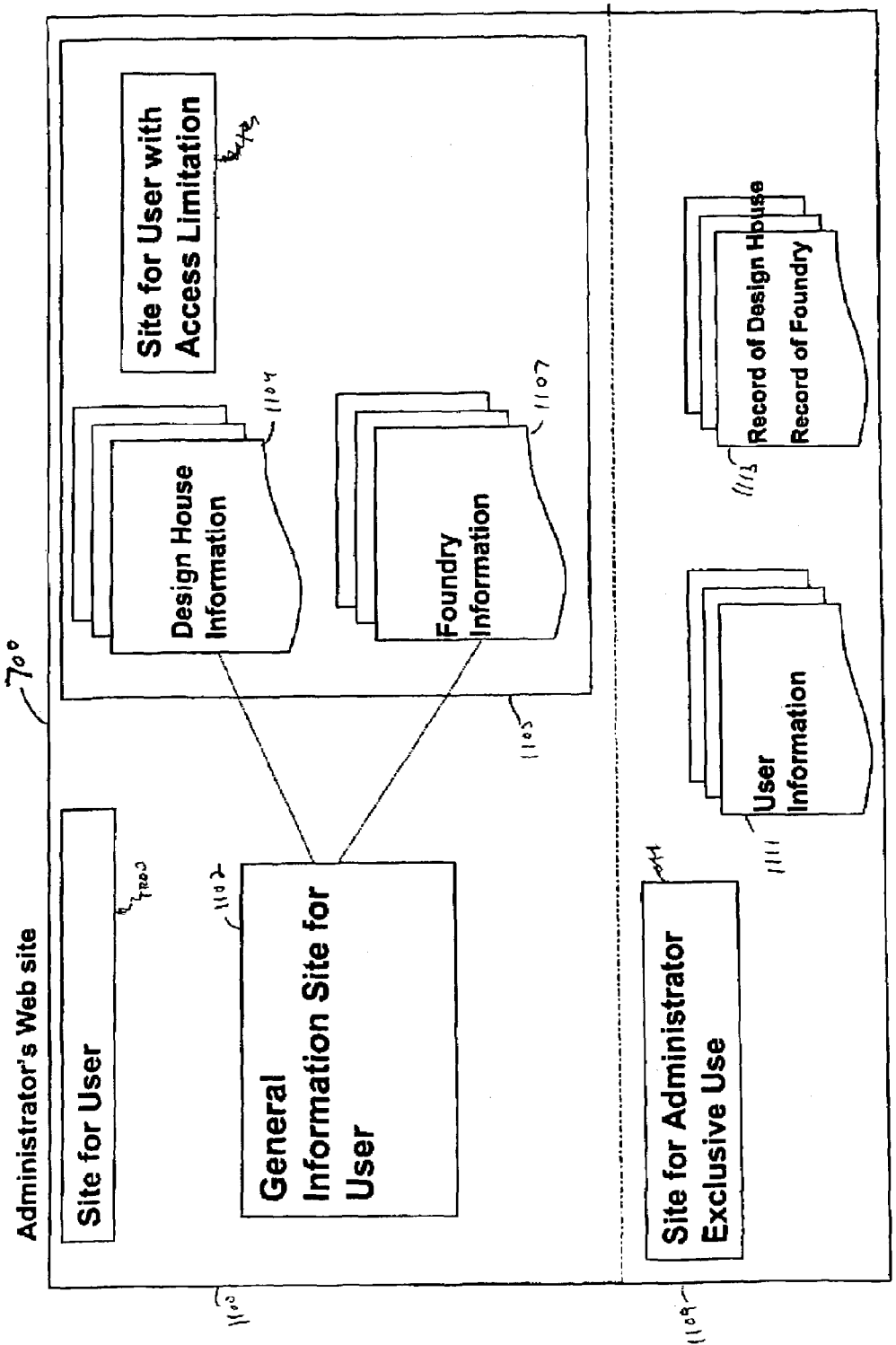
FIG. 12 is a block diagram showing information held at different security levels within an administrator's website.
Figure 13:
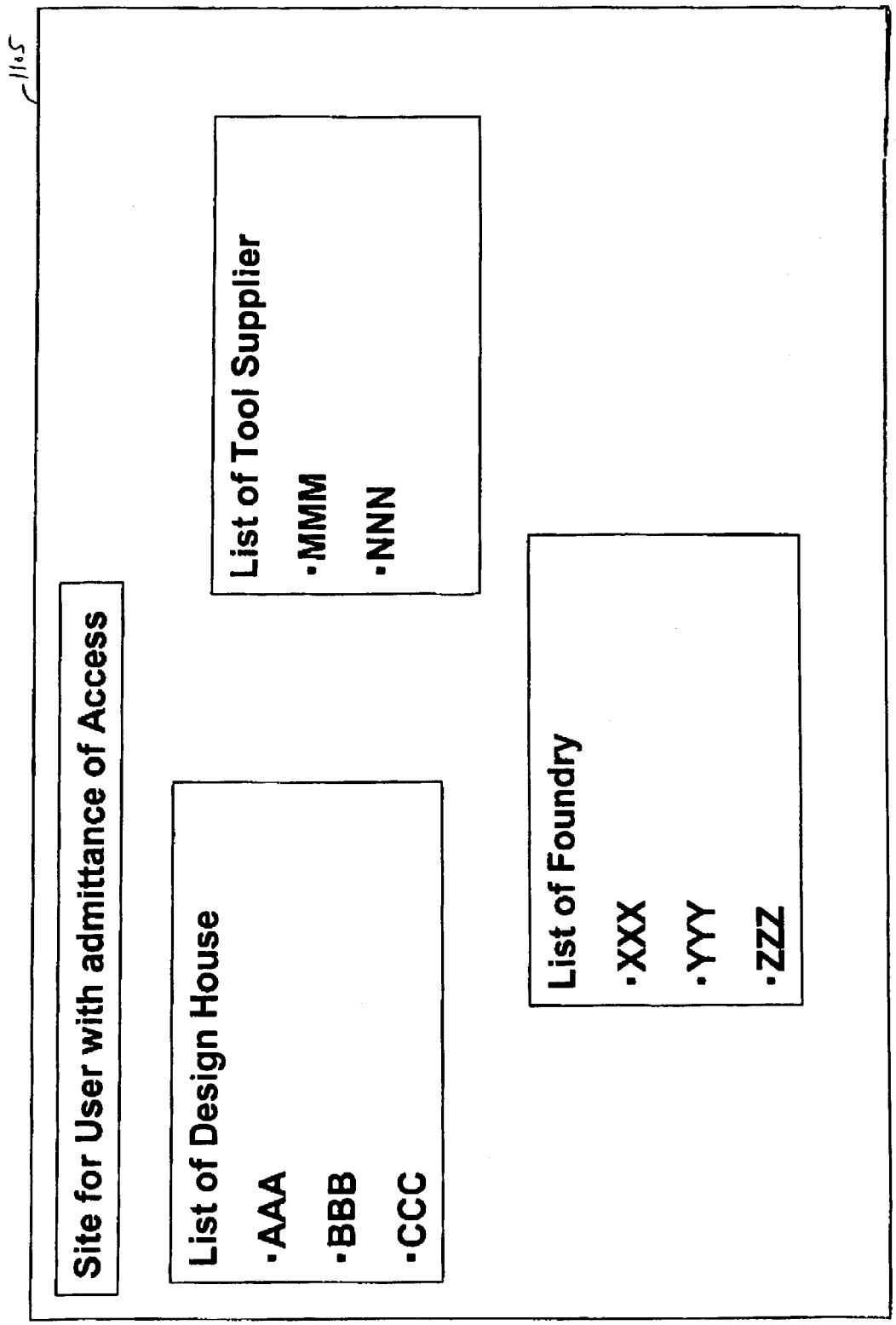
FIG. 13 shows an exemplary user interface showing a listing of the different design houses, foundries and tool suppliers that may be used according to the present invention.
Figure 14:
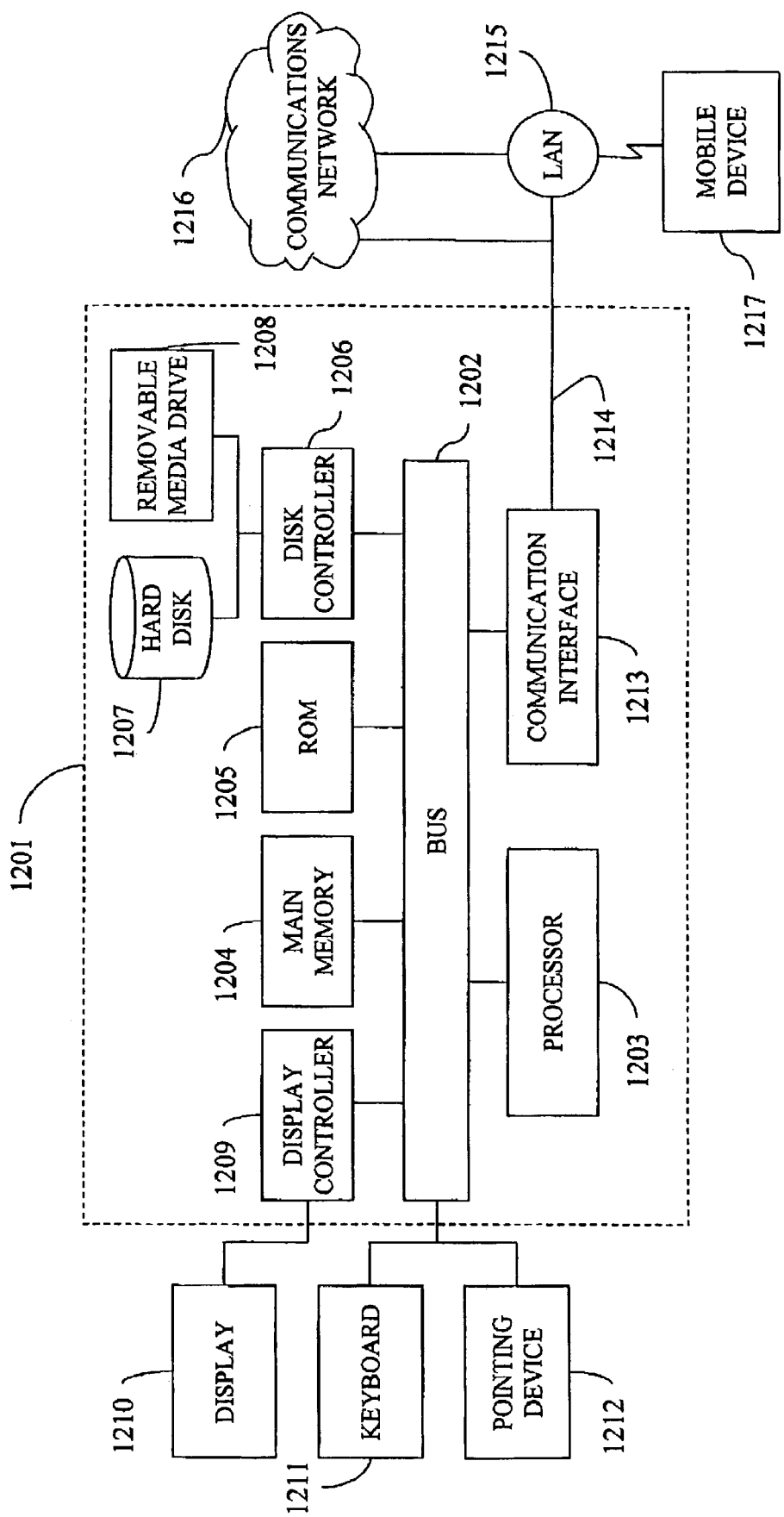
FIG. 14 is a block diagram showing-components of a web server that may be used according to the present invention.

More details of the administrator's website 20 is found in the discussion regarding FIGS. 12, 13 and 14. For the present discussion, however, the administrator's website 20 is hosted on one or more server computers, that contain therein (1) an ID grant/administration department, (2) a user information administration department (3) a license and agreement information storage department, (4) a license agreement information administration department, and (5) a processor core storage department. The tool supplier's website 40 includes a tool user information administration department and a tool storage department. The user computer may be one or more computers having a communication interface and a browsing capability such as Internet Explorer, or file exchange capability.

As will be discussed in greater detail with regard to the diagram of FIG. 4, the user 3 communicates a request to the administrator's website 20, requesting access to information regarding the use of the processor core information (or more generally IP core information). This first request is done at the most basic level of authorization, and may be made a member of the public who has not previously interacted with the administrator's website 20. After the user 3 provides selected information, by way of prompt by the webpage on the administrator's website 20, the administrator's website 20 verifies that the user 3 is an acceptable candidate for receiving information. The administrator's website 20 verifies that the information provided by the user 3 is not included in a database of users who have previously been denied access. For example, if a past user has violated the terms of the license agreement, the administrator's website 20 may deny access to that particular user. For integrity purposes, the user 3 may be required to provide personal or company unique information, for example a name, alternatively/complementarily a DES signature, credit card information or the like.

Assuming the administrator's website 20 grants access to the user 3, at least for the first level of accessibility, the administrator's website 20 assigns an identification (ID) and a password to the user 3 and informs the user 3 of the same. In reply, the user 3 may then use the ID and the password to request access, at least for evaluation purposes, of the IP core information (the following example presumes the IP core information is a processor core information). If the user 3 properly executes the license agreement, then the administrator's website 20 will confirm that the license is accurately executed and issue a second password, and optionally a second ID, to the user 3. The second password signifies that the user has been granted authorization to a second level of accessibility, which enables the user 3 to receive, for evaluation purposes, one or more processor core information or other IP core information. The IP core information such as the processor core information is a configuration RTL that is prepared by the administrator. An IP core information for evaluation purposes may optionally include code that automatically terminates the accessibility of the evaluation version of processor core after a certain predetermined number (e.g., 3) accesses to the processor core information, or after a predetermined time. This way, the user 3 is allowed to use the processor core RTL for a limited amount before the processor core RTL is automatically rendered ineffective.

With regard to the license agreement, the user 3 may be required to verify his or her ability to enter into a contract as a representative of his or her employer. This may be done, for example, by limiting license agreements only to corporate officers, for example. In such situations, the administrator's website 20 may perform an independent check by retrieving, perhaps by way of the Dunn & Bradstreet corporate summary service, information regarding the present corporate officers for the user 3. Alternatively, the company may provide a list of pre-approved individuals authorized to act on behalf of the company. Once the user 3 provides information consistent with that kept on the administrator's website 20, and an executed document (either with a physical signature or a digital signature), assent of the two parties is present and therefore the license is executed. The legal "consideration" for the user 3 is limited access to the IP core, while consideration for the IP owner/licensor (which may have delegated its duties to the administrator of the website) is the prospective opportunity to obtain a fee after the evaluation period.

If the user 3 also subscribes either by way of the administrator's website 20 or the tool supplier website 40, to have access to the design tools needed to customize the IP core information, then the user 3 also is provided from the administrator's website 20 (or alternatively, the tool supplier's website 40) with the ID and a third password. The ID and third password grant a third level of access to the user 3, so as to be able to access the tools for use in customizing the IP core information. The ID may be assigned the different one from each of the first, second, third and fourth access levels.

Furthermore, if the user 3 concludes that the user would like to download the processor core information (usually in an RTL format, although other formats might be available) for making a product, the user 3 may assent to another license agreement between the administrator and the user, where the user 3 is given a fourth level of access, entitling the user 3 to download the processor core information (or other IP core information) for manufacturing by the user 3. The administrator provides a certification number to the user at the time of downloading. This certification number is later used when arranging a manufacturing order with the registered foundry.

Optionally, the administrator's website 20 may prompt the user to download preselected tools, based on the IP core information selected by the user 3. To accomplish this function, the administrator's website 20 includes a memory that hosts a look-up table, which includes recommended tools (as suggested by the administrator or tool supplier) for the different IP core information.

One feature of the present invention is that either no royalty is required at the time of the downloading of the processor core information, or only a minimal fee initially owed by the user 3 so that the user does not have appreciable up-front royalty payments prior to actually producing product. In this way, the user 3 is empowered to customize the IP core and develop a product, and then once the user 3 provides that core (as customized by the user 3) to the foundry, it is the foundry who pays a running royalty to the IP administrator. This way, the user 3 is not charged directly, and has minimal, if any, charges at the time of evaluation or initial product design. Rather, when the cash flow is expected to be more substantial for the user 3, the user 3 is essentially charged a higher payment/unit by the foundry. From the administrator's perspective, it is advantageous because more users will have access to a key technology such as an IP core for use in developing a new product for the marketplace.

The foundry, although it has a responsibility of reporting and paying royalties to the IP administrator, already has established relationships with the owner of the IP, as well as the IP administrator. In order to minimize the risk of a foundry and a design house using the technology provided by the user 3 (including the processor core information), the processor core information optionally includes a watermark such that a unique portion of the gate design layout, with otherwise no particular functionality, will be included in the final gate design to provide a "logic watermark" on the chip. This particular gate layout will serve as a "fingerprint", indicating the owner of the IP core information, as well as a licensee 3, and certification code, so that if product is made by yet another foundry or a user who is unauthorized or unlicensed to use the IP core information, may be traced back to the foundry of origin so that an investigation may be commenced to identify the breach in contractual obligations.

Figure 4:
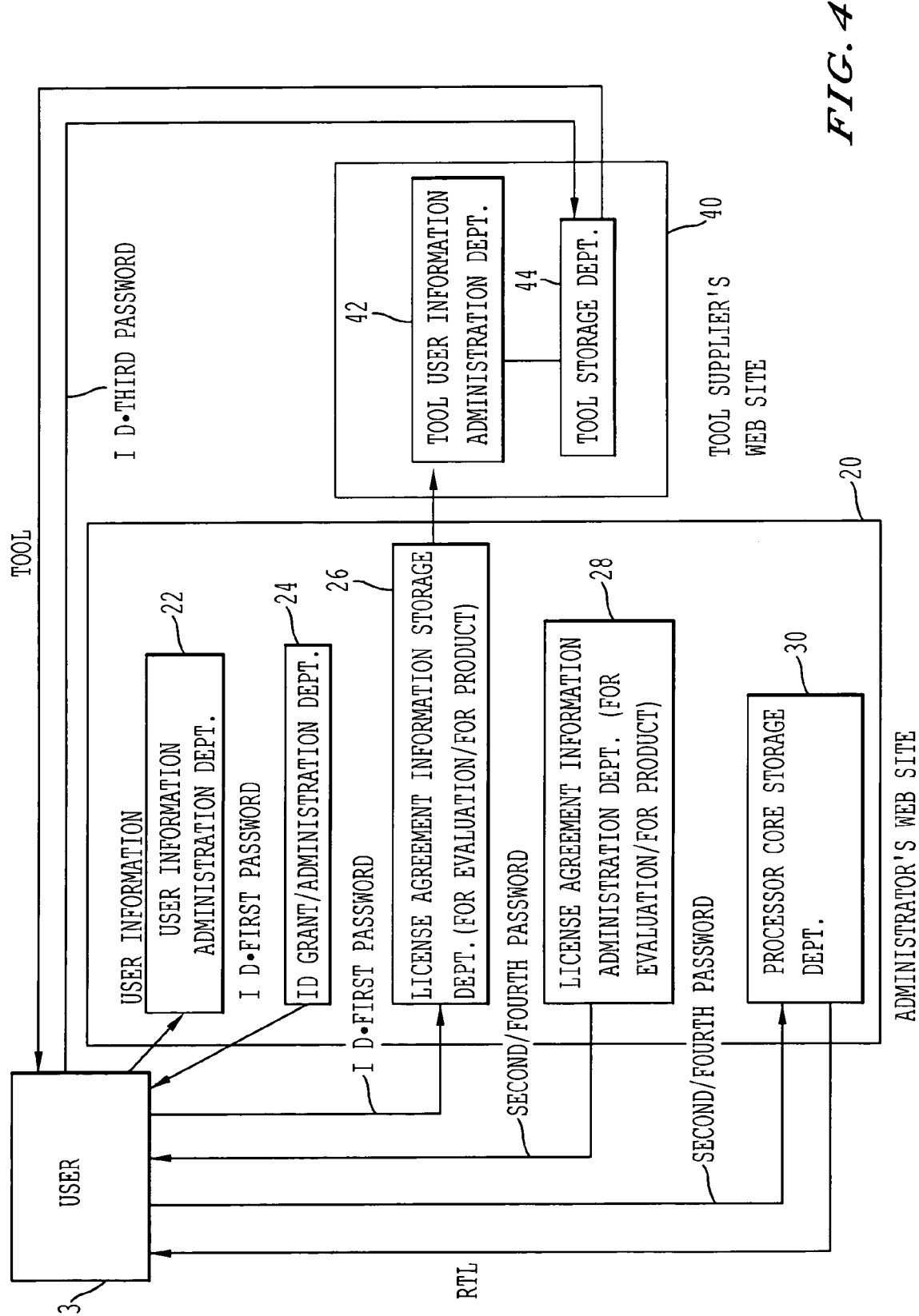
FIG. 4 is a diagram of steps for obtaining an appropriate password level authorization to be able to download an IP core.

FIG. 4 is a block diagram showing the communications between a user 3, the administrator's website 20, and the tool supplier's website 40, as shown. Initially, the user 3 communicates over the communication link (e.g., an Internet connection using a web browser) to a user information administration department 22, providing the administrator's website with information about that particular user. The information may include name, company, previous account number, address, credit card number, as examples. In reply, the user information administration department 22 verifies that the information provided by the user is not on a list that would prohibit the user 3 from being granted a first password and identification. If the user information administration department 22 concludes that it is acceptable to provide the user 3 with a first level of authorization, then the ID grant/administration department 24 provides a unique ID and first password combination to the user 3. The user information administration "department" 22 can by completely a computer-based operation that performs a look-up and compare operation. This ID and first password information grants the user 3 with a first level of authorization.

The user 3 may then provide the ID and first password to a license agreement information storage department 26 held on the administrator's website 20. If the user 3 agrees to the terms of the license, which is presented to the user in a page served from the administrator's website 20, or alternatively in a paper form, then the license agreement administration department 28 provides a second password to the user 3, which grants the user 3 with a second level of authorization or access. According to the selected level authorization or access to the user 3, the processor core storage department 30 provides a list showing a plurality of prepared IP core information (such as configuration processor core information) for evaluation to the user 3. The user 3 then selects at least one of the prepared IP core information for evaluation. The second level of authorization enables user 3 to request an evaluation of the IP core information for use by the user 3. If the user 3 elects to download the IP core information for further evaluation, the user 3 may then enter the second password into the processor core storage department 30, which after verifying the authenticity of the second password, provides an RTL format of the IP core information to the user 3 for evaluation. The processor core storage department 30 provides the RTL format of the selected IP core information when the user 3 selects the IP core information after obtaining the second password.

The license agreement information storage department 26 may share information with the tool supplier's website 40, such that the tool user information administration department 42 already has information regarding this particular user. Thus, if the user wishes to download the tool supplier's tools for use in using the IP core information, the user 3 may request an ID and third password from the tool user information administration department 42, by way of the tool storage department 44. Once granted, the user may request, after inputting the third password, that the tool storage department 44 provide the user 3 with a software copy of selected tools for use on the user's computer.

As a result of executing the different license agreements described in FIG. 4, the user 3 has an evaluation copy of the IP core information as well as a tool to manipulate the same and create a custom processor. If the user 3, however, concludes that the user 3 would like to have a version of the IP core information that could be used to actually make a product, not merely for evaluation purposes, then the user 3 may make a second request to the license agreement information storage department, requesting access to the highest level of security, namely the fourth level of authorization or access. In this fourth level of authorization, after executing another license agreement provided by the administrator's website 20, and verified by the administrator's website 20 after execution by the user 3, a standard version (not an evaluation version) of the IP core, in RTL format, is provided to the user 3 for use in actually developing a product. Indeed, if the user 3 agrees to the terms of the license, which is presented to the user 3, the license agreement information administration department 28 provides a list of authorized foundries. The user 3 then selects the foundry, and also inputs a production relating information which is a estimated quantity of IC chips to be ordered to the foundry, the timing of a manufacturing production, a category of the IC chips such as IC chip for a mobile usage or PC usage and a specification having a definable portion of user 3. After receiving the above information, the administrator verifies. If the administrator concludes that it is acceptable to provide the user 3 with a fourth level of authorization, the administrator designs the IP core information in RTL format including user-definable portion, which is configured to perform the specification requested by user 3. For example, the user-definable portion includes an option instruction, capacities of a memory and/or cache register and a debug function. If the administrator completes to design the configured IP core information in RTL format, the license agreement information administration department 28 provides a fourth password and a certification number to the user 3. The administrator informs the selected foundry of the certification number and user information relating to a manufacturing production which is obtained at the registered stage of the fourth level of authorization. The notice to the selected foundry is determined in accordance with the manufacturing timing for production required by the user 3.

Figure 5:
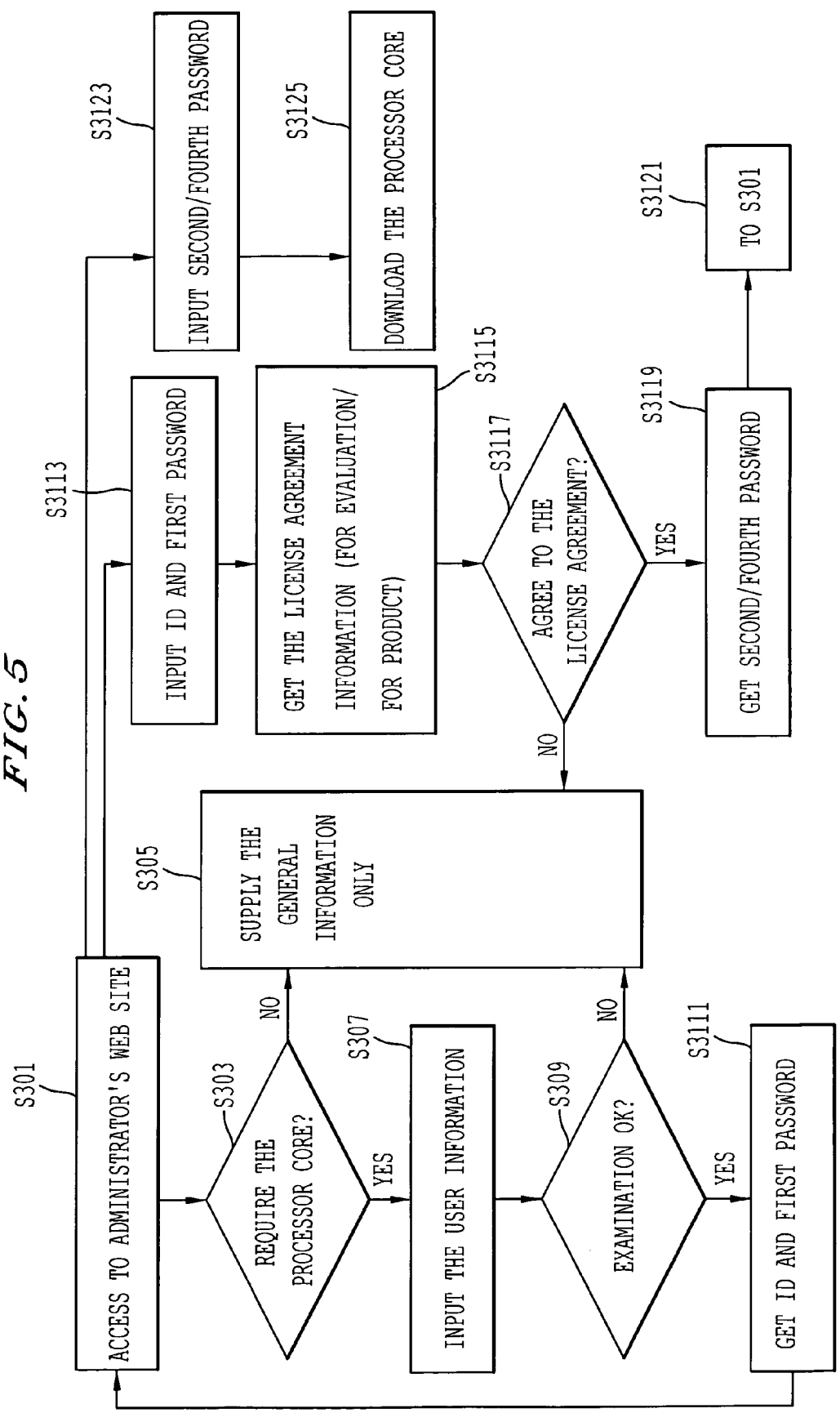
FIG. 5 is a flowchart of process steps taken by a user to download a design tool.

FIG. 5 is a flowchart explaining a process for downloading of an evaluation version of the IP core. The process begins in step S301 where the user gains access to the administrator's website by way of an Internet browser. If it is the user's first time on the administrator's website, or the user does not otherwise have an ID and password, the user will be directed to an inquiry in step S303 where the user is asked whether the user requires the processor core. If the response is negative, then the process proceeds to step S305, where the user is supplied with general information only about the process offered by the administrator's website. Subsequently, the process ends. However, if the response to the inquiry in step S303 is affirmative, the process proceeds to step S307 where the user is prompted to input user information, which is performed in step S307. Subsequently, the process proceeds to step S309 where an inquiry is made regarding whether an examination of the input provided by the user reconciles acceptably with the data records held by the administrator's website. If the response to the inquiry in step S309 is negative, the process proceeds to step S305 and only general information is provided. Moreover, the user is not granted access to a first level of authentication. On the other hand, if the response to the inquiry in step S309 is affirmative, the user is granted access to the first level of authentication and the process then proceeds to S3111.

In step S3111, the administrator's website provides an ID and a first password to the user. The user may then return to the administrator's website S301 and proceed to step S3113 where the user inputs the ID and first password, as a preliminary step to getting access to an evaluation version of the IP core. Subsequently, the process proceeds to step S3115, where the administrator's website provides the user with a license agreement, the execution of which is required before the user is granted a second level of authorization for evaluation of the IP core. The process then proceeds to step S3117 where an inquiry is made regarding whether the user agrees to the terms of the license agreement. This license agreement can be either in a written form (on paper, as opposed to electronic) or in a click-wrap version such that the user merely assents to the terms of the license agreement by clicking on a "terms accepted" button on the administrator's website. If the response to the inquiry in step S3117 is negative, the process proceeds to step S305, and only general information is supplied to the user. On the other hand, if the response to the inquiry in step S3117 is affirmative, the process proceeds to step S3119, where the user is granted a second password, and then the process returns to step S3121, returning to the administrator's website.

Alternatively, if the user has actually concluded that the user wishes to execute a license agreement for the information in steps S3115 and S3117, the user is granted a fourth password in step S3119 so as to be given a fourth level of authorization, thereby enabling the user to have access to the IP core information for actually producing a product. To obtain the fourth level of authorization, the user provides the estimated production information including a foundry selection, a quantity of the production, a timing of production and a requesting specification after the user agrees to the terms of the license. The administrator then verifies and, if so, it starts to design the IP core information that is configured to perform the user's specification. To obtain the second level of authorization, the administrator's website provides a list of a plurality of IP core information for evaluation, which are prepared by the administrator. The user selects at least one of them. After step S3121, the user has the option of proceeding to S3123, where the user inputs either the second or fourth password and downloads in step S3125 the IP core information, either for evaluation purposes (second password), or for producing a product (fourth password). Subsequently, the process ends.

Figure 6:
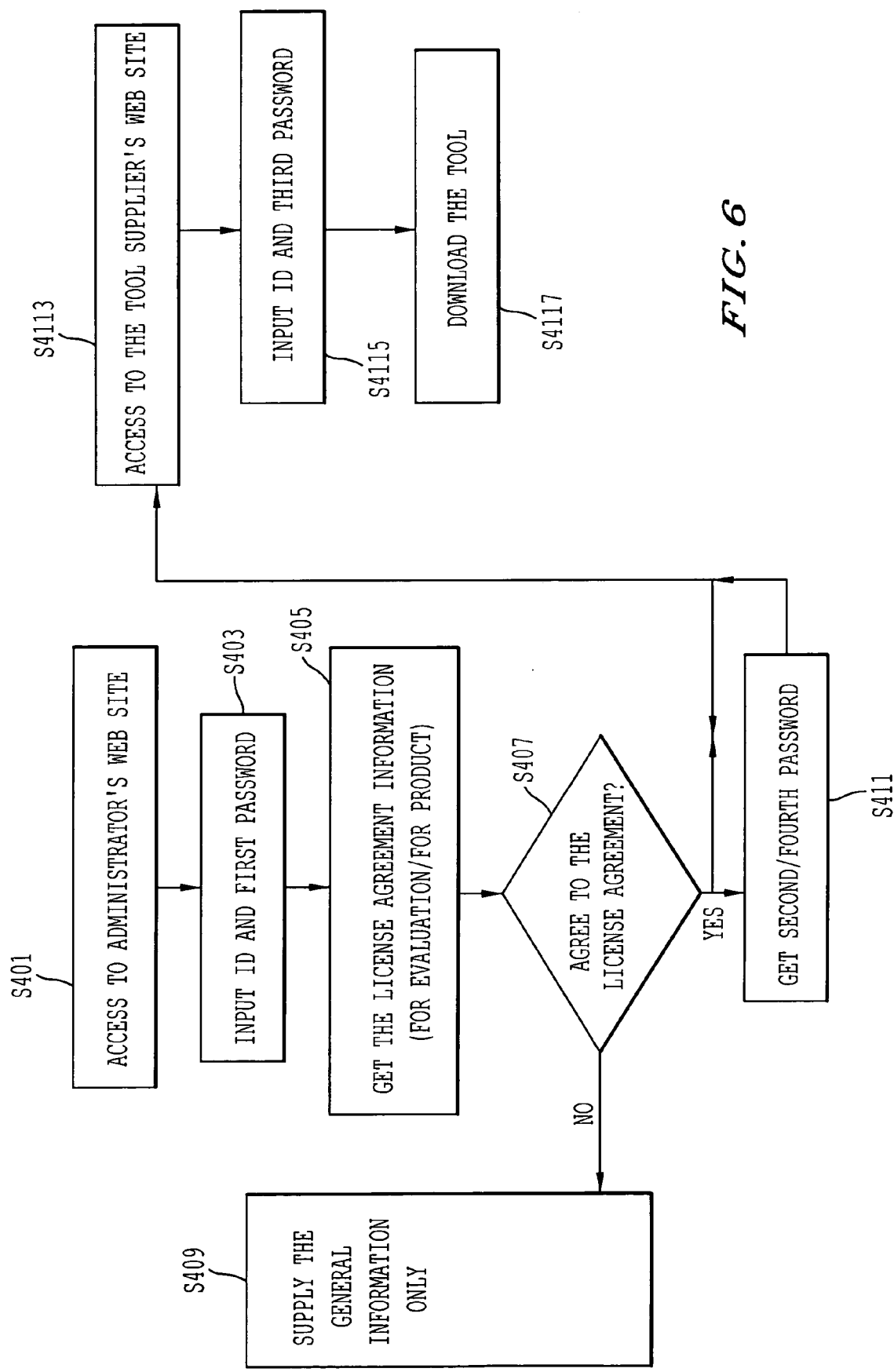
FIG. 6 is a flowchart showing a functional relationship where information is exchanged between an administrator website, a tool supplier website and a user.

FIG. 6 is a flowchart describing how a user may first acquire access to a tool supplier's website, and then download the tools from the website. The process begins in step S401, where the user obtains access to the administrator's website as was previously discussed with regard to FIG. 5, step S301. The process then proceeds to step S403, where the user inputs the user's ID and first password. Once verified by the administrator's website (or alternatively by the tool supplier's website), the user is granted the first level of authorization. Subsequently, the process proceeds to step S405 where the user gets the license agreement information for evaluation or for developing a product, similar to step S3115 in FIG. 5. The process then proceeds to steps S407 and S409, as well as step S4111, which are consistent with steps S3117, S3119, and S305 in FIG. 5. At the conclusion of step S4111, the user at least has been granted access to the second level of authorization. At this point, the user is able to access the tool supplier website S3113 and be provided in step S3115 with an ID and third password, which grants the user access to tools from the tool supplier's website. Optionally, the tool supplier may require a license to use the tools, and therefore another step would be required in order for the user to execute the license agreement and be provided with the tools. Once executed, or at least once the ID and third password have been entered, the user is granted access to the third level of authorization and in step S4117, the user may download the tool to the user's computer.

Although not shown in FIG. 6, but is shown in FIG. 12, the user may also be granted access to a list of candidate design companies (design houses) that may assist the user in designing the extensions for the processor core information. Such design houses pay commission fees to the administrator if the selected design house is to make an extension that connects to the processor core information. The user is prompted with a list of candidate design houses, where once the user selects one of the design houses, the selected design house will contact the user either directly, or by way of computer network, to establish a relationship for assisting the user in developing the extensions. In the situation where the user will actually manufacture the processor that was designed by the design house, then the user has to request such manufacturing activity to a registered manufacturing company (foundry). At this time, the user must show a certification number to the manufacturing company. The certification number is assigned to the user by the administrator as recognition that the user is entitled to manufacture products using the IP core information.

As was the case with the design houses, the foundries may also be registered with the administrator's website. Thus, it makes it easy for a user to select a candidate-licensed manufacturer to make the processor modules. The foundry then pays a royalty based on the manufacturing fee of the processor product including processor core information. Separate from the license of the manufacturing processor core, the user may obtain a license on a peripheral IP core using the communication network. In this case, the user is required to take another license with the administrator separately. Furthermore, the administrator can also support the design house, which is registered on the website. Moreover, the administrator may provide support services to the design house to assist the design house in their goal of developing product for end users who use the IP core information. The advantage of this method is that the user can quickly design and manufacture the configurable processor in a very short time, easily, and with minimal upfront cost to the user.

An advantage from the administrator's aspect is that the administrator can provide the IP core information to a large number of entities and can make the IP core information widely distributed in the industry in a relatively short period of time, without having to do the complete design, manufacture and sales by itself. Using this method, the number of product made by IP core information can be increased relative to the standard design and manufacturing process used according to conventional methods. Furthermore, by using a web-based (or computer communication network-based) approach to licensing and design, it is possible to keep track of, and even provide statistics on, the delivery time for different candidate manufactures from the time of initial order. This information, when presented to a user on the administrator's website, may be helpful to the user, when the user is deciding which manufacturer to choose.

Figure 7:
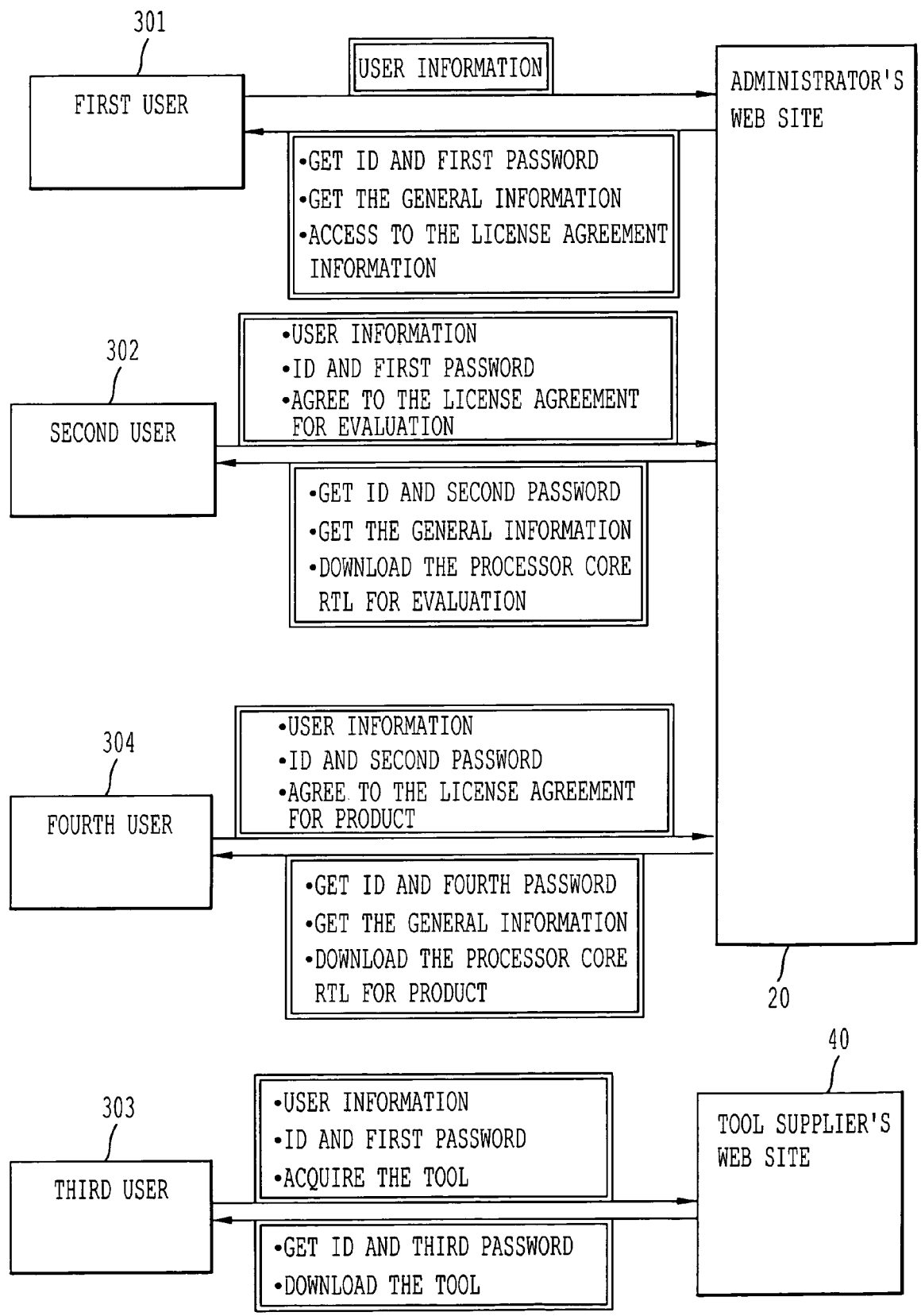
FIG. 7 is a block diagram showing the type of information exchanged between different users, the administrator website, and a tool supplier's website.

FIG. 7 is a block diagram showing the information exchanged between different users, the administrator's website 20 and tool supplier's website 40. The respective users 301, 302, 304, and 303, are illustrative of different users having different access, but could be the same user. An initial user, a first user 301, provides user information to the administrator's website 20. Once the information is verified as not being problematic (e.g., on an unauthorized list of users), the administrator's website provides the first user 301 with an ID and first password. The first user at this first level of authorization is granted access to general information about the process and the products. Furthermore, the first user 301 is able to have access to the license agreement terms.

The second user 302, namely a user interested in obtaining this second level of authorization, provides user information, the ID and first password provided as the first user 301, and then agrees to the terms of the license agreement for an evaluation period. If the user agrees to the terms of Agreement, the administrator's website 20 indicates a list of processor core configuration in RTL format for evaluation. The user then selects at least one of the processor core configuration. In reply, the administrator's website 20 provides the ID (which may be the same ID as provided for the first access level), but a second password that entitles the user to get not only the general information, but also download the selected processor core information in an RTL format for evaluation by the second user 302.

A fourth user 304 (which may be a first user 301 or a second user 302 who is interested in obtaining the fourth level of authorization) provides user information, ID and second password, as well as an assent to the license agreement to produce a product, to the administrator's website 20. Indeed, if the user 304 agrees to the terms of the license, which is presented to the user 304, the administrator's website 20 provides a list of authorized foundries. The user 304 then selects the foundry, and also inputs a production relating information which is a estimated quantity of IC chips to be ordered to the foundry, the timing of a manufacturing production, a category of the IC chips such as IC chip for a mobile usage or PC usage and a specification having a definable portion of user 304. After receiving the above information, the administrator verifies. If the administrator concludes that it is acceptable to provide the user 304 with a fourth level of authorization, the administrator starts to design the IP core information in RTL format including user-definable portion, which is configured to perform the specification requested by user 304. For example, the user-definable portion includes an option instruction, capacities of a memory and/or cache register and a debug function. If the administrator completes to design the configured IP core information in RTL format, the administrator's website 20 provides a fourth password and a certification number to the user 304. The administrator informs the selected foundry of the certification number and user information relating to a manufacturing production which is obtained at the registered stage of the fourth level of authorization. The notice to the selected foundry is determined in accordance with the manufacturing timing for production required by the user 304. In return, after verifying the information provided by the fourth user 304, the administrator's website 20 provides an ID and fourth password so as to be given the fourth level of authorization to the second user 302 as a fourth user 304 (where again, the ID may be the same as that provided above with regard to the first and second users, but a different password) and may also be provided with general information, as well as an ability to download the processor core RTL to produce product.

A third user 303, which again may be one or more of the first user 301, second user 302, or fourth user 304, is an entity seeking to obtain access to the third level of authorization. The third user 303 provides user information, the ID and first password, and a request to acquire the tool from the tool supplier's website 40. After checking this information, the tool supplier's website 40 provides an ID (which may be the same as that for the first, second or third users above), and a third password. This enables the third user 303 to download the tool.

Figure 8:
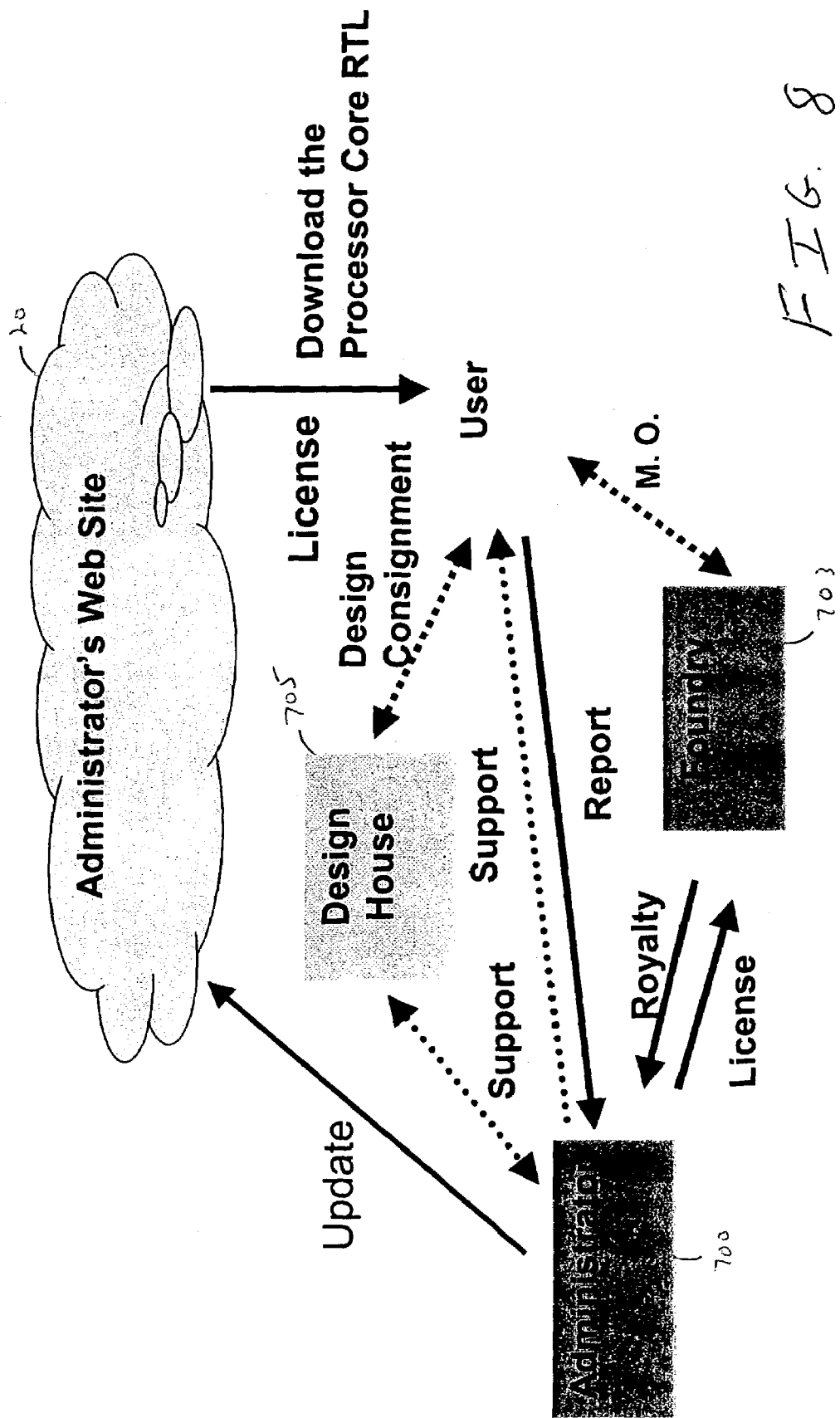
FIG. 8 is a block diagram like that of FIG. 5, although includes a design house.

FIG. 8 is a block diagram showing both technical exchange of information, as well as an exchange of money and legal rights. An administrator 700 is an agent, or perhaps the owner or licensor of the IP. In the latter case, the administrator has the IP core information and operates an administrator's website 20 (although the website and the administration function may be outsourced to a third party). One duty of the administrator 700 is to provide updates to the processor core or other IP cores that are hosted on the administrator's website 20, as further developments are made. The user, as discussed above, executes a license with the administrator to download the processor core RTL. Once the user has the processor core, the user's duties are not yet completed. Instead, it is routine for the user to require support from a design house 705. Such design houses usually require some sort of consignment from the user in exchange for providing services for further defining the product. Because the user has taken a license from the administrator, the administrator provides support both to the user, as well as the design house 705, which was designated by the user. This designation may be done by way of the administrator's website 20, and so the design house 704 may automatically receive support from the administrator, by way of its contractual agreement with the user.

The user also provides reports to the administrator regarding the certification of the product that it will seek to develop by way of the foundry 703. Moreover, the user and the foundry 703 agree to develop a manufacturing order so that a certain number of units may be made at the foundry 703 on behalf of the user. As discussed above, the user is provided with certification information, that is also provided in the report to the administrator 700, so that the foundry 703 will be under obligation to pay a royalty to the administrator 700, based on the product actually made at the foundry 703, in exchange for the royalty payment from the foundry 703 to the administrator 700, the administrator 700 grants a license to "make" to the foundry 703 for the benefit of the user.

Figure 9:
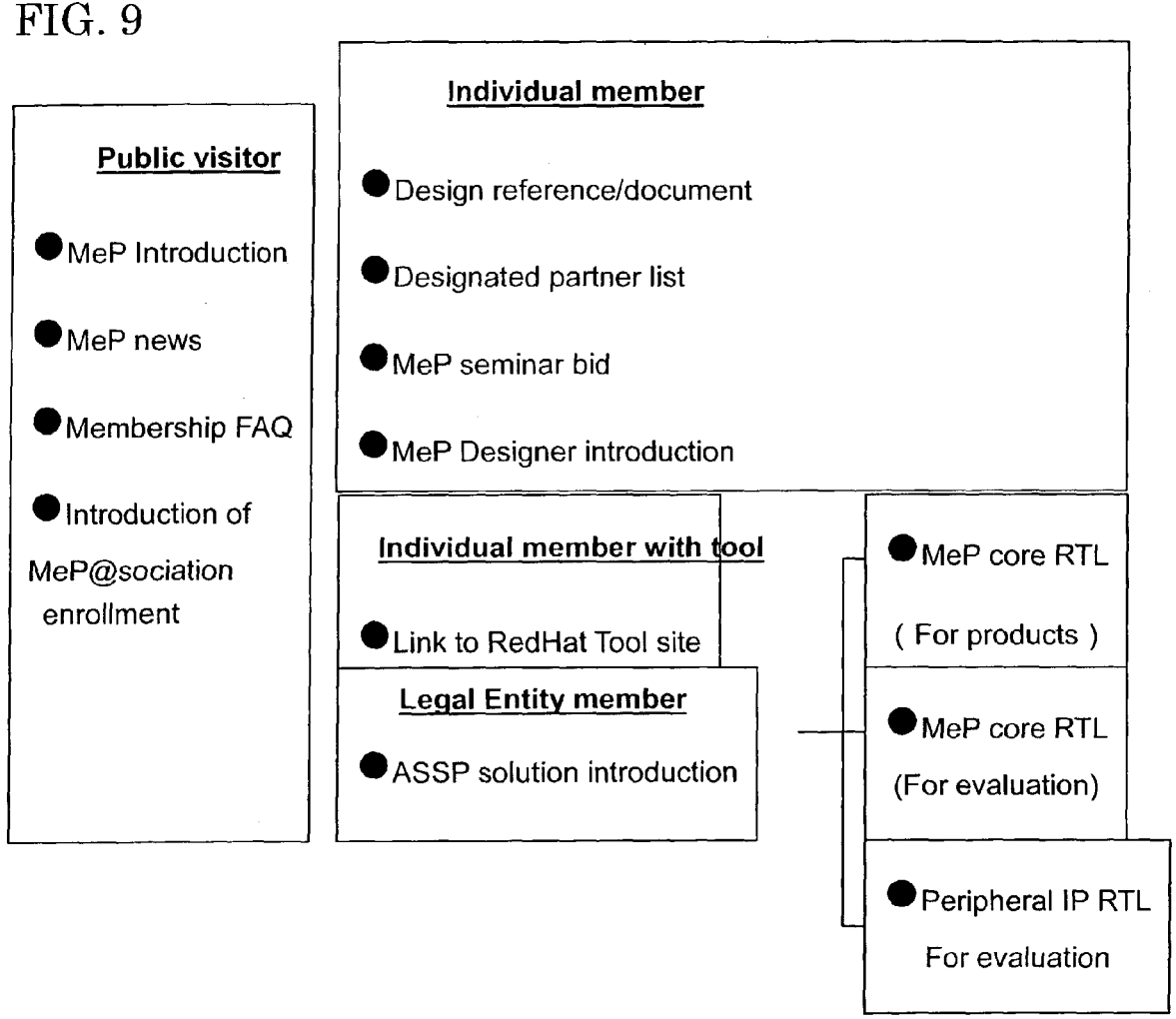
FIG. 9 illustrates a content relating to each level of authorization.

FIG. 9 illustrates a contents relating to each level of authorization in case of MeP. Any public visitor obtains a Media Embedded Processor (MeP) introduction, MeP news, a membership FAQ and introduction of MeP enrollment, through the administrator's website, but does not obtain other information. A first level user obtains a design reference/document, a design partner list, a MeP seminar bid, a MeP designer introduction, a link to the related site and a legal entity member introduction. A second level user obtains a MeP core RTL for evaluation and a fourth level user obtains a MeP core RTL for manufacturing. Both of the second and fourth level users obtain an ASSP solution introduction. A third level user obtains a link to RedHat Tool site. The administrator can further provide the license for peripheral IP RTL (such as DMAC, VCI-AMBA and VCI-Gbus) to only legal entity member (for example the second level user or the fourth level user) regardless of processor core information licensing status.

Figure 10:
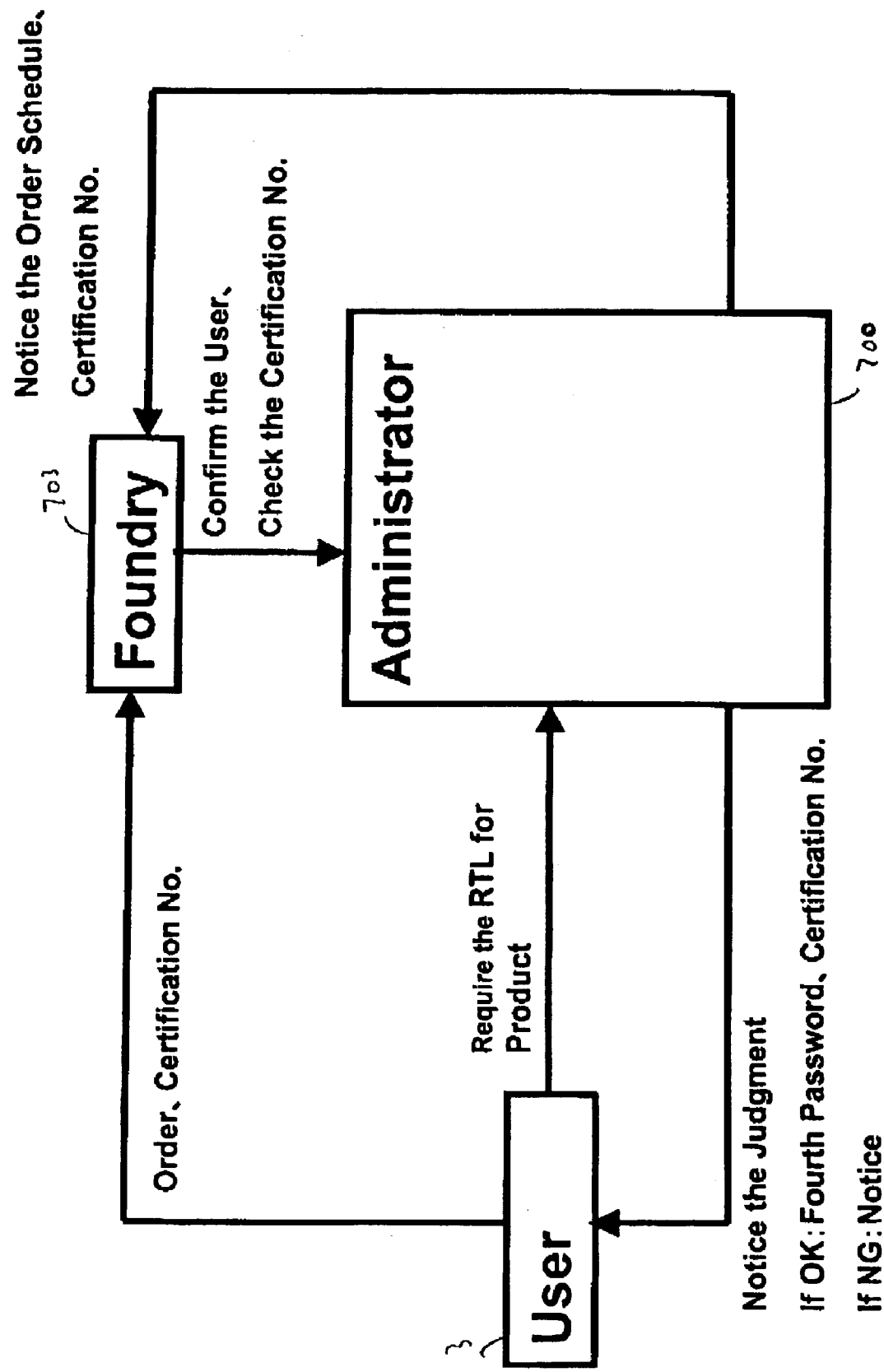
FIG. 10 is a block diagram showing information exchanged between a user, administrator and foundry.

FIG. 10 is a block diagram showing a relationship between the administrator, user and manufacturing company (a foundry). If the user agreed to take a license from the administrator to manufacture an processor core, at that time, the user will choose a foundry that should be registered on the administrator's website. The administrator 700 will then judge whether the user may or may not download the processor core information based on the user information, and the foundry identified as the manufacturing foundry by the user 3. If the administrator permits downloading of the processor core information, the administrator provides the user 3 with a host password and identification number, which the manufacturing company (foundry) can be used to designate the particular user. If the administrator 700 does not permit the user 3 to use a particular foundry 703, the administrator 700 will inform the user 3 of this fact so that the user 3 may identify another foundry 703.

Once the foundry 703 receives the request from the user 3 in the form of a manufacturing order and a certification number, then the foundry 703 will report this user request and provide the certification number to the administrator 700 for checking. The foundry 703 will then begin manufacturing.

The royalty structure, then, is based on the product actually made by the foundry 703, for the benefit of user 3, and is paid to the administrator 700. Because the users are uniquely identifiable, and certain project numbers are identifiable by certification number, the royalty rates may be adjusted on a case-by-case basis, as the administrator 700 may offer some discounts to some users. This approach is believed to be advantageous for all involved, as it allows the Internet to be used to effectively share information, assign limited rights and facilitate communications to make manufacturing quickly and easily, while not hindering the royalty licensing process.

Figure 11:
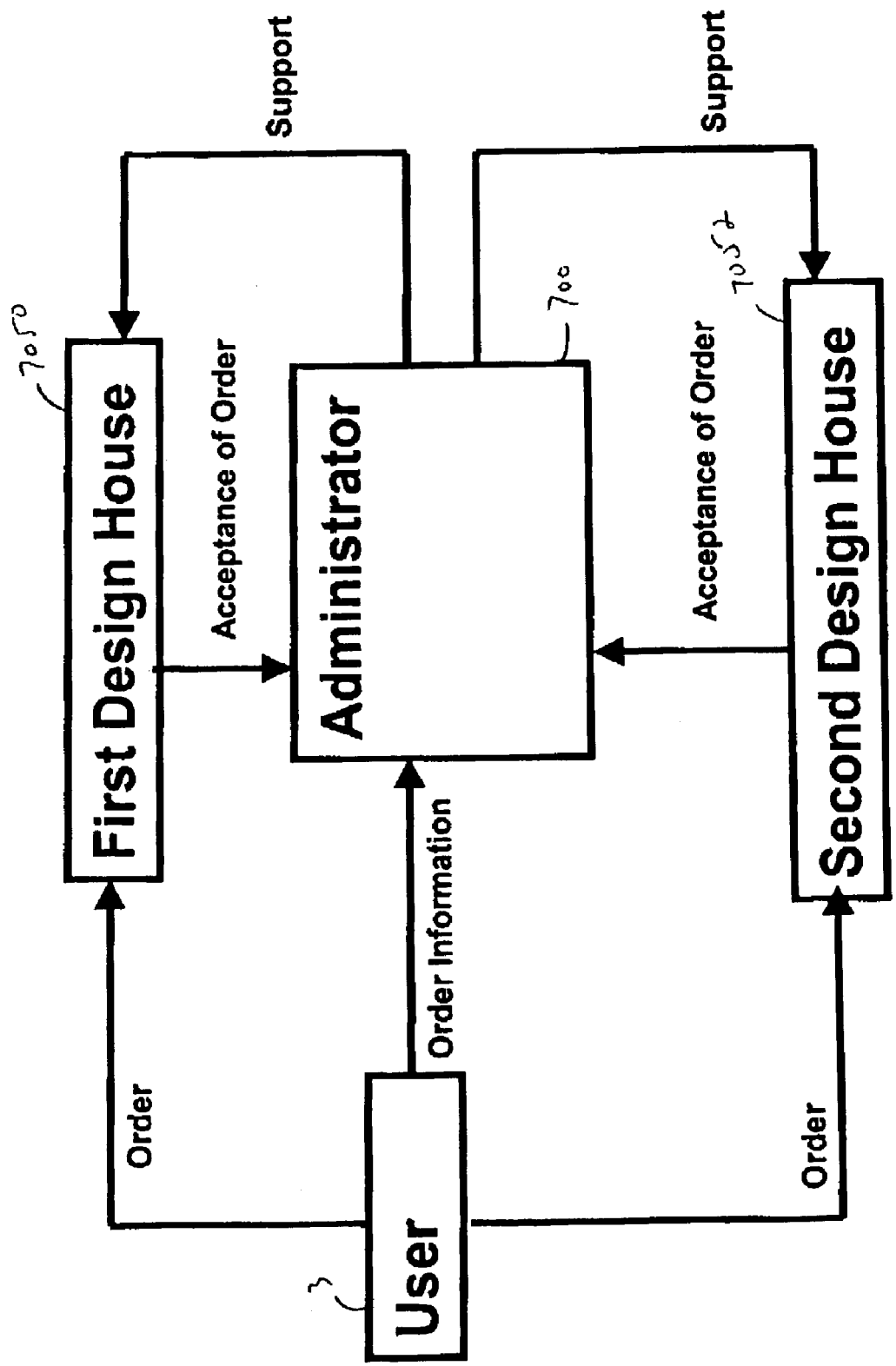
FIG. 11 is a block diagram showing information exchanged between a user, administrator, and first and second design houses.

FIG. 11 is a diagram showing a relationship between an administrator 700, user 3, and respective design houses 7050 and 7052. In this situation, the user 3 may request the design of an extension that is used with the processor core information. This request may be made in the form of an order either to (or even both) the first design house 7050 or second design house 7052. These design houses 7050 and 7052, licensed to use processor technology for example MeP by the administrator in terms of extension design and/or processor core information incorporation, may be registered on the administrator's website for easy selection by the user 3. The design houses may, however, be registered to perform only certain functions. The first design house 7050 may only be registered to design extensions for user 3 (such as web customer and/or customer), while the second design house 7052 may be registered to design IP incorporating processor core information and extensions for their product sales, as well as design extensions. The user 3 will provide the order information to the administrator 700, identifying the name (or associated code for the respective design houses).

The first design house 7050 may take a license from the administrator 700 for the purposes of designing an extension for the configurable processor and may be registered on the administrator's website 700 for this purpose. Administrator 700 can differentiate design houses 7050 and 7052 from user 3 on the licensed technology for each function deployment.

In such a situation, the first design house pays a royalty based on a commission fee for designing extensions of the processor core information, based on a request by user 3(such as web customer and/or customer). On the other hand, the second design house 7052 may obtain the rights not only for designing extensions, but also for designing IP incorporating processor core information and extensions for their product sales, which requires another license right, above and beyond that granted to the first design house. It should be noted that either the first or second design house might design the extension. The second design house 7052 may carry out the role of the first design house 7050, but the first design house 7050 may not carry out the role of the second design house. Moreover, if the first design house 7050 carries out the role of the second design house 7052, then the first design house 7050 has to take another license agreement to be able to assist in the expanded design effort.

The user 3 is able to confer with the first or second design houses on the design of the final product by way of an external communication network. If the first or second design house receives a request from the user, then the first or second design houses have to notify the user of the information and the contents of the request to the administrator, using the external communications network. By this notification, a user can compare the contents of the request received by the first or second design house and the administrator can require royalties from the first and second design house. Also, the first or second design houses can approach their designated extension product information on the website and also the user may defer such uploaded information and also get information on the product through such designated websites before their request. Also, the first or second design house may (or may be required by the license with the administrator to) grant-back the designated processor extension, or modified processor core, to the administrator. The administrator can provide the extension and processor information using the external network. In this way, the administrator can expand the available options for the user. Following this process, the administrator may make a standard processor core in a very short time, and also the first design house and second design house may establish an ability to prevail over the competition by quickly and easily assisting users in developing product through their design houses.

On condition on the license, modifications to the IP core information, extension, or peripherals are granted back to the administrator, and such modifications are used to populate a database of available IP core information. Similarly, tool providers as well pre-approved foundries (i.e., registered foundries that have a license agreement in place with the IP administrator) may be listed for selection by the user/licensee, with the same benefit of not have to obtain further contracts with these facilities. By offering on the IP administrator's website listings of registered design houses, tool providers, and foundries, enables a licensee/user to quickly and efficiently develop a new product that would otherwise have been quite troublesome, in terms of cost and internal staff-hours, to produce. The system divorces the legal rights to make, use and manufacture from being the licensee's/user's responsibility so the user can focus on the design and manufacturing process without wasting resources on the legal requirements of teaming with a diverse set of partners.

Tracking of the use of the processor core information may be accomplished by providing a certification code to the licensee/user, which in turn provides the user ID and certification code to the foundry when executing a purchase order. In this way, by certifying the processor core, and perhaps including a surreptitious watermark to ensure all IP are preserved, an automated product tracking function may be performed, where the licensing costs are applied not at the time of contractual agreement with the IP administrator, but at the time of manufacture at the foundry. This way, the user/licensee does not incur substantial licensing costs until product is actually made, and thus the user/licensee need not "float" substantial sums of licensing revenue prior to making a product available on the market.

FIG. 12 illustrates an administrator's website, and in particular, a partitioning of information that is available for access to a user based on the level of authorization to the user. The administrator's website 700 includes a user site section 1100, and an administrator site section 1109, which is exclusively for the use of the administrator. The user site 1100 includes general information site for the user 1102, which is available at the first level, and then access limited site portion 1105, which includes foundry information 1107 and design house information 1104. In a further level of security not shown, includes the IP core information, which requires a different level of authorization.

The administrator site 1109 includes user information 1111 and record information of both the design house and the foundries 1113, which are not available in any way for the user. This information, exclusively used by the administrator, is used to verify records such that when IDs and passwords are provided by the user, the information provided by the user can be compared against the user information 1111. Furthermore, records including certification numbers and production records, provided by the design houses and foundries, are kept in the record 1113.

FIG. 13 further illustrates the limited access site 1105, which presents to the user that has at least first level of authorization, a listing of the design houses, foundries, and tool suppliers, that have arrangements with the administrator, that will ensure minimal problems since the administrator fully supports these design houses, foundries, and tool suppliers.

FIG. 14 illustrates a computer system 1201 upon which an embodiment of the administrator web site according to the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed, to execute the sequences of instructions contained in main memory 1204. In alternative embodiments, hardwired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modification and variations of the present invention are possible in light of the above teachings. It is therefore to be understood that within the scope of the appended claims, the invention may be practiced otherwise than as specifically described herein.

The invention claimed is:

1. A method for providing IP core information through a Web network configured to interconnect a plurality of users, the method comprising:
   (1) accessing a predetermined Web site by a user;
   (2) inputting a user information to the predetermined Web site by the user;
   (3) registering and managing the user information including at least one password for the user through the Web network;
   (4) providing an ID and a first password to the user as a first level user through the Web network in response to the user information transmitted to the Web site;
   (5) providing a license condition to the first level user through the Web network in response to the ID and the first password transmitted to the Web site by the first level user;
   (6) receiving an agreement to license terms from the first level user so as to become a second level user having access rights to the IP core information through the Web site;
   (7) providing a second password and a certification number of the IP core information to the second level user through the Web network;
   (8) providing an IP core information in RTL format to the second level user in response to the ID and the second password transmitted to the Web site;
   (9) selecting, by the second level user, at least one design house that is registered in the Web site as an authorized design house, and requesting the design house selected in the selecting at least one design house to design an extension for an IP core identified by the IP core information through the Web site;
   (10) designing a module comprising the IP core and the extension in accordance with the IP core information in RTL format obtained through the Web network and the extension designed by the design house;
   (11) selecting, by the second level user, at least one manufacturer which is registered in the Web site as an authorized manufacturer, and requesting the authorized manufacturer to make the module in accordance with the module designed in the designing the module and the certification number through the Web site; and
   (12) manufacturing the module by the authorized manufacturer, wherein
   the IP core is a processor core, and the module is a processor module.

2. A method for providing a processor core information through a Web network configured to interconnect a plurality of users, the method comprising:
   (1) accessing a predetermined Web site by a user;
   (2) inputting a user information to the predetermined Web site by the user;
   (3) registering and managing the user information including at least one password for the user through the Web network;
   (4) providing, by a provider, an ID and a first password to the user as a first level user through the Web network in response to the user information transmitted to the Web site;
   (5) providing, by the provider, a manufacturing license condition to the first level user through the Web network;
   (6) providing, by the provider, a second password and a certification number of processor core to the first level user as a second level user who transmits an acknowledgement to agree the manufacturing license condition to the predetermined Web site;
   (7) providing, by the provider, a processor core RTL to the second level user in response to the ID and the second password transmitted to the predetermined Web site;
   (8) selecting, by the second level user, at least one design house registered in the predetermined Web site as an authorized design house, and requesting the design house selected in the selecting step to design the processor core identified the processor core RTL and an extension for the processor core through the Web site;
   (9) designing, by the design house selected in the selecting the authorized design house, a processor module comprising the processor core and the extension in accordance with the processor core RTL and the extension through the Web site;

(10) selecting, by the second level user, at least one manufacturer which is registered in the predetermined Web site as an authorized manufacturer, and requesting the authorized manufacturer make the processor module in accordance with the processor module designed in the designing the processor module and the certification number of the processor core through the Web site; and

(11) manufacturing the processor module by the authorized manufacturer.

3. The method according to claim 2, further comprising:

(1) notifying the provider, by the second level user, of the manufacturer selected in the selecting the manufacturer and a number of estimated processor modules to be manufactured.

4. The method according to claim 3, further comprising:

(1) notifying to the manufacturer, by the provider, the number of estimated processor modules to be manufactured and the certification number of processor core.

5. The method according to claim 4, further comprising:

(1) confirming the predetermined notice of the certification number of the processor core directly from the provider and the certification number of the processor core directly from the second level user;

(2) notifying, by the selected manufacturer, the confirmation result to the provider.

6. The method according to claim 2, further comprising:

(1) notifying, by the design house, in response to the request from the second level user, the request to the provider.

7. The method according to claim 6, further comprising:

(1) confirming the request from the second level user to the design house and the request from the design house to the provider.

8. The method according to claim 7, further comprising:

(1) providing information of the extension designed by the design house on a Web site by the design house.

9. The method of claim 1, wherein:

said processor module is a Media Embedded Processor.

\* \* \* \* \*